Sept. 11, 1962   M. J. FLEMING, JR   3,053,046
RESILIENT CONNECTOR
Filed May 28, 1959
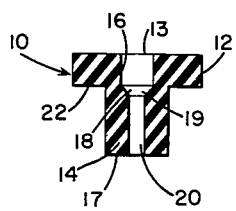
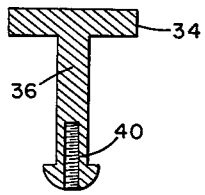
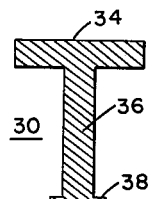
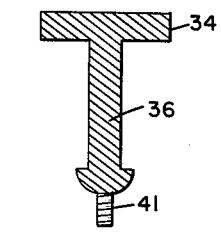
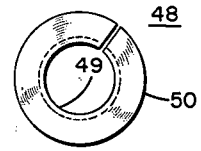
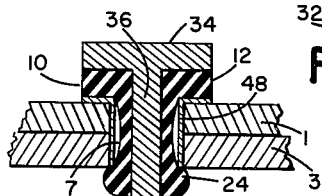
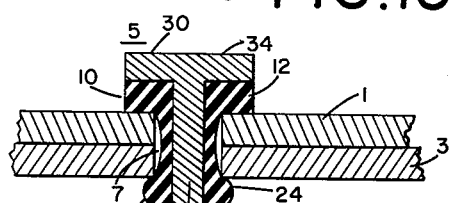
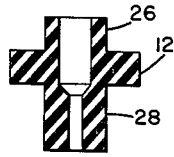
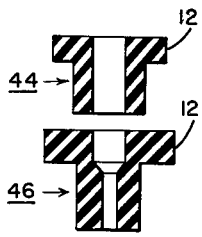
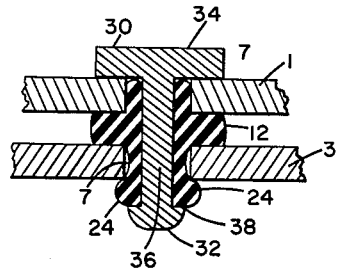
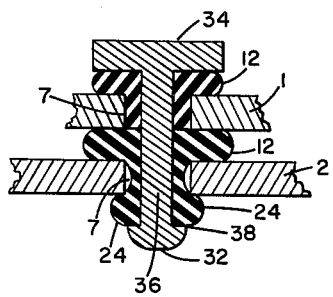
INVENTOR.
MATTHEW J. FLEMING, JR.

United States Patent Office 3,053,046
Patented Sept. 11, 1962

3,053,046
RESILIENT CONNECTOR
Matthew J. Fleming, Jr., Bay Village, Ohio, assignor to Clevite Harris Products, Inc., Milan, Ohio, a corporation of Ohio
Filed May 28, 1959, Ser. No. 816,621
6 Claims. (Cl. 85—40)

This invention relates to resilient connecting devices and more particularly to blind connectors for holding together a plurality of work pieces. The instant device absorbs vibratory motion, avoids rattling and may serve as an insulator or sealer between work pieces.

This invention finds application in a wide variety of places. For instance, connecting structural components, for the support of metering devices, motor mountings, instrument panels, or any similar device wherein resilient mounting of structures or the resilient connection thereof is desirable, particularly where electrical or thermal insulation of such objects is required.

A problem heretofore encountered has been the effect of vibration or rattles, as the case may be, upon individual mechanical components. It is well known that screws, bolts, nuts and the like have a tendency to open under continued vibratory effect. An automobile is a good example; it is an every day occurrence that people experience loss of parts, or the malfunction of components by virtue of such disengagement. This invention enables the elimination of all rotating parts in a fastening device and reduces the number of components to two basic structures.

Devices of the prior art have attempted to achieve this objective by providing an elastic rubber bushing fitting into a socket member opening, the length of the bushing therein extending beyond the opening of the socket member, and the bushing being adapted to receive a stud which extends coaxially therethrough and an enlarged head of the stud member laterally forces the outward projecting portion of the bushing into radial expansion, thereby providing a locking engagement. An illustration of such prior art can be found in Patent 2,876,485. The stud and the bushing are secured together by "merely pressing the parts into engagement." The stud can be readily withdrawn upon application of a force slightly greater than the force required to insert the stud. It is evident that shocks or vibration acting in an unfavorable direction towards the stud will tend to push the stud out of engagement.

The instant device avoids these shortcomings by locking the rigid stem member securely into place and disengagement can only take place at the expense of virtual destruction of the device. The degree with which dampening and/or absorbing of shocks may be effected is only limited by the chemical composition of the flexible material. The latter qualities are well known to those familiar with the art and a great many compositions are readily available.

It is therefore apparent that an object of this invention is to provide a resilient connector of a simple design which may be adapted for light or heavy duty as a resilient connector, support or insulator.

Another object of this invention is to provide a simplified resilient connector which is characterized by the fact that it functions by the mere use of two mechanical components.

Another object of this invention is to provide a device which may be rapidly assembled without the use of screws, bolts, nuts, lock washers or the like; the process of assembling by impact being characterized by the velocity of inserting the rigid member.

Another object is to provide a resilient connector in which all components may be manufactured out of light-weight materials, so that the device may be employed to great advantage where weight is a decisive factor.

Another object is to provide a device, of the kind described, which may be constructed without the use of moving parts. The simplicity of the device is further enhanced by the fact that the device is suitable as a blind connector.

Another object is to provide a resilient connector which is adapted to be employed as support structure for attaching related parts.

It is a further object of this invention to provide a resilient connector combining the elements of an efficient seal. The sealing protection is effectual as between the connected objects for substantially any medium, whether pressurized gases or liquids. One of the marked characteristics of the device is that it will not disconnect by itself by mere application of pressure loading, or when operatively incorporated between two varying pressures.

Other objects and advantages of this invention will be apparent from the following detailed description and accompanying drawings:

FIGURE 1 is a cross sectional view showing the device in normal load carrying position, interconnecting resiliently two plates which are in contact with each other;

FIGURE 2 is a cross sectional view showing a modified device in normal load carrying position, resiliently interconnecting two spaced apart plates;

FIGURE 3 is a view similar to FIGURE 2 showing the device in modified form, using a plurality of flexible members so that all metal parts are held in spaced apart relationship;

FIGURE 4 and FIGURE 5 are sectional views showing the flexible member and the rigid member, respectively, of the device of FIGURE 1;

FIGURE 6 is a sectional view showing the flexible member of the FIGURE 2 device;

FIGURE 7 is a sectional view showing the flexible members of the device shown in FIGURE 3;

FIGURE 8 and FIGURE 9 are views showing modified forms of the rigid member as shown in FIGURES 1, 2 and 3; and FIGURE 10 is a cross sectional view showing the device of FIGURE 1 incorporating a rigid bushing of FIGURE 11, or the bushing in modified form as shown in FIGURE 12.

An aspect of the present invention resides in a resilient connector extending through registering apertures in a first and a second plate means, which includes an elongated body formed of non-metallic and elastic material having a bore along its central axis and composed of coaxially disposed cylindrical portions. This body comprises a flange, a shank secured within the apertures, and an annular bead. The material constituting the shank and the bead portion equals, volumetrically, substantially the volume defined by the apertures in the first and second plate means minus the volume of the central bore in the shank portion. The flange extends radially and abuts the first plate means. The shank is integral with the flange and axially distended relative to the flange to form a circumferentially necked down portion. The bead is located remote from the flange and abuts the second plate means, the bead having a transverse wall thickness which is greater than the wall thickness of the shank. A rigid stem projects through the bore and has at one end an enlarged head which coacts with the second plate means to clamp the bead therebetween and to maintain the shank in distended condition, the bead being formed of material dislodged by the rapid advance of the enlarged head through the bore.

Referring now to FIGURE 1, there is shown a resilient connector 5, comprised of a flexible member 10 and a rigid shank member 30 engaging and retaining in assembled position an upper plate 1 and a lower plate 3.

The member 10 shown in FIGURE 4 is constructed of deformable and resilient material and has an elongated shape, with a flange portion 12 or an enlarged seating collar projecting radially outward at one end and a shank portion 14 integral with the flange extending downwardly and in common symmetry therewith.

The plate means, such as upper plate 1 and lower plate 3, have registering apertures into which the shank portion 14 is inserted and the lower end of the shank portion at this point is substantially flush with the lower plate 3. The flange 12 abuts against the upper plate 1.

The flange portion 12 is provided with a centrally located circular bore 16. The rigid member 30 forms at one end an enlarged head 32 which is inserted into this opening 16 to put the device into operating condition. A continuous bore of reduced diameter extends downwardly from the bore 16 along the central axis of the flexible cylindrical member 10. The continuous bore 13 along the central axis has an intermediate portion 18 arranged between the wide bore section 16 and a narrow bore section 20; the intermediate portion 18 providing a gradual connection between the wide and narrow confine of the bore. The three stepped bore sections 16, 18 and 20 provide, in concert, a communicating passageway. The intermediate portion 18 is, preferably, formed in the shape of a frustum of a right circular cone. The base 19 of the frusto-cone-like portion 18 is adjacent to the bottom 22 of the flange portion 12, as shown in FIGURE 4.

To provide an impact surface the rigid member 30 may be provided with a flanged head 34 and a stem portion 36 connecting the flange 34 with the enlarged head 32. The outside diameter of the stem 36 is smaller than the outside diameter of the head 32. At the junction where the stem 36 terminates, the sphere-like head 32 provides a seating shoulder 38 to accommodate the bead 24 hereafter described. The seating shoulder is a small land 38 between the outside diameter of the stem 36 and the outside diameter of the rounded head, the latter describing more particularly a spherical sector, the back portion of which provides for the aforementioned flat land or seating shoulder 38.

The diameter of the narrow bore section 20 is substantially less than the dimension across the rounded head 32 of the rigid member 30, the latter being smaller than the diameter of the registering apertures in the plates 1, 3, and the bore 20 is narrower than the broad circular bore 16. The outside diameter of the shank portion 14 of the flexible member corresponds generally with that of the plate aperture 7, so that the shank portion 14 may be snugly fitted therein.

Before insertion of the rigid member a lubricating film is applied over the external surface of the rigid member. When so prepared the rigid member 30 is brought into contact with the bore 16 for insertion, so that upon high velocity movement of the rigid member into the bore the enlarged head 32 contacts the intermediate portion 18, a downward force or impact upon the flanged rigid head 34 is required to drive the rigid shank member toward final or assembled position. When such a force is applied to the rigid member 30, the enlarged rigid head 32 forcefully expands the intermediate bore section 18 and the path of the narrow bore section 20, thereby deforming the flexible mass, and forcing the elastomeric material into a severe downward elongation and dislodgement. This distention causes a shrinking of the shank walls with the result that parts of the shank are circumferentially necked down. The structural relationship between the plate aperture and the flexible member prohibits any substantial radial expansion of the flexible mass. After assembly the diameter of the narrow bore 20 is expanded to equal the diameter of the rigid shank 36. The dislodged material, i.e., excess mass of rubber, seeking the way of least resistance is forced out of the bottom of the aperture 7 forming the thick bead 24 adjacent to the opening 17. It is important that the insertion of the rigid member takes place with impact, since the velocity by which the rigid member is forced through the flexible member must be appreciable in order to overtake the inertia of the mass and its intent to return to the original unstressed position. When inserted with proper speed the bead 24 is snapped and permanently clamped between the outer edge 17 of the opening 20 and the rounded head 32 and the shank is maintained in distended condition. The bead has a transverse wall thickness greater than the wall thickness of the shank and, of course, the bead is formed solely of material dislodged from the shank portion within plates 1 and 3.

The length of the stem 36 is substantially equal to that of the flexible member 10 after assembly, i.e., incorporating the bead 24 as formed by the distention of the shank, and taking into consideration the amount of compression required to retain the bead 24 in tight operating position.

In the modification shown in FIGURE 2, the plates 1 and 3 are resiliently mounted and spaced apart, the flange head 34 of the rigid member 30 abutting the upper plate 1. In this modification the rigid member has the same structure as shown in FIGURE 5. However, the resilient connector has an upper shank portion 26 as shown in FIGURE 6, extending from the top of the flange. The general symmetry of the upper shank 26 is in structural conformity with the lower shank 28, and the outside diameter substantially corresponds with the internal diameter of the aperture in the upper plate 1, and the common bore of all sections is in axial alignment. While the operation and the general structure corresponds with the structure as described with reference to FIGURE 1, the diameter of the upper shank bore may be varied and is not necessarily restricted to the same size as that of the flange bore 12 as shown in FIGURE 6.

FIGURE 3 shows another modification in which a plurality of flexible members are utilized. This modification is somewhat similar to FIGURE 2, except that it provides a resilient flange between the upper plate 1 and the rigid flange 34. As illustrated in FIGURE 7, the lower flexible member 46 is similar to the one illustrated in FIGURE 4 and the upper flexible member 44 has a bore in axial alignment with the bore of the lower flexible member 46.

FIGURES 8 and 9 show some ways of utilizing the rigid head for the purpose of attaching objects thereon.

FIGURE 8 discloses the rigid member 30 with a threaded bore 40, centrally located, at the top of the enlarged head extending inwardly into the stem member 36. A bolt, screw, or object of like import may be threadedly inserted into bore 40. In FIGURE 9 a threaded stem 41 is outwardly extended to receive an object or to threadedly engage a nut or the like.

FIGURE 10 shows another modification of the basic device shown in FIGURE 1. Herein, a bushing 48 of rigid material, such as aluminum, is inserted into the plate apertures 7 prior to insertion of the flexible member 10.

The bushing wall is split, as shown in FIGURE 11, and the split is continuous, extending from end to end of the bushing. FIGURE 11 shows the bushing forming a cylindrical wall 49 and an outward flange 50 extending therefrom at one end. The contours of the bushing may vary with the particular application of the device, but substantially conforms to the external shape of the flexible member and the aperture in the plate.

The addition of bushing 48 provides for greater rigidity of the device and prevents shearing stresses upon the flexible material. The bushing also presents the cutting of sharp edges into the flexible material.

In FIGURE 12 there is shown a modification of the bushing 48 shown in FIGURE 11. The bushing 53 is similar to bushing 48, except that the outward flange portion 52 comprises a plurality of segments.

In accordance with the patent statutes the principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the drawings to the specific details disclosed.

I claim:

1. A resilient connector extending through registering apertures in first and second plate means comprising, in combination: an elongated body, formed of non-metallic and elastic material, having a bore along its central axis and composed of coaxially disposed cylindrical portions including a flange, a shank secured within said apertures, and an annular bead, the material constituting the shank and the bead portion equals, volumetrically, substantially the volume defined by the apertures in the first and second plate means minus the volume of said central bore in the shank portion; said flange extending radially and abutting the first plate means; said shank being integral with said flange and axially distended relative to said flange to form a circumferentially necked down portion; said bead, located remote from said flange and abutting said second plate means, having a transverse wall thickness greater than the wall thickness of said shank; a rigid stem projecting through the bore having at one end an enlarged head coacting with said second plate means to clamp said bead therebetween and maintain said shank in distended condition; and said bead being formed of material dislodged by the rapid advance of said enlarged head through said bore.

2. A resilient connector according to claim 1, and structural support means on said enlarged head for securing a structure thereto.

3. A resilient connector according to claim 1, and a rigid bushing having a tubular portion and a flanged portion integral therewith, the tubular portion secured partly within said apertures and interposed between said plates and external surfaces of said body, said bushing having a longitudinally extending continuous split wall.

4. A resilient connector according to claim 1, wherein said flange is located between the longitudinal ends of said shank and in load carrying relation with and between said first and second plate means.

5. A resilient connector according to claim 4, wherein said stem forms at the end opposite from the enlarged head a shoulder; and a second flange of resilient material secured coaxial with respect to said body and clamped between said shoulder and the first plate means.

6. A resilient connector according to claim 1, wherein the bore of said body is a stepped diameter bore constructed and arranged to facilitate said dislodgment.

References Cited in the file of this patent

UNITED STATES PATENTS

| | | |
|---|---|---|
| 830,501 | Goehst | Sept. 11, 1906 |
| 1,880,953 | Fageol | Oct. 4, 1932 |
| 2,264,747 | Fether | Dec. 2, 1941 |
| 2,453,991 | Kaemmerling | Nov. 16, 1948 |
| 2,642,253 | Markowitz | June 16, 1953 |
| 2,721,332 | Smith | Oct. 25, 1955 |
| 2,787,051 | Risley | Apr. 2, 1957 |
| 2,876,485 | Cowles | Mar. 10, 1959 |
| 2,921,819 | Rifkin | Jan. 19, 1960 |
| 2,951,674 | Rice | Sept. 6, 1960 |
| 2,956,468 | Macy | Oct. 18, 1960 |
| 2,968,207 | Flogaus | Jan. 17, 1961 |